(12) United States Patent
Spiesser

(10) Patent No.: US 12,466,661 B2
(45) Date of Patent: Nov. 11, 2025

(54) DEVICE FOR PROVIDING SORTED CLOSURE ELEMENTS

(71) Applicant: SIDEL ENGINEERING & CONVEYING SOLUTIONS, Reichstett (FR)

(72) Inventor: Daniel Spiesser, Reichstett (FR)

(73) Assignee: SIDEL ENGINEERING & CONVEYING SOLUTIONS, Reichstett (FR)

( * ) Notice: Subject to any disclaimer, the term of this patent is extended or adjusted under 35 U.S.C. 154(b) by 914 days.

(21) Appl. No.: 17/623,263

(22) PCT Filed: Jul. 2, 2020

(86) PCT No.: PCT/EP2020/068699
§ 371 (c)(1),
(2) Date: Dec. 28, 2021

(87) PCT Pub. No.: WO2021/001490
PCT Pub. Date: Jan. 7, 2021

(65) Prior Publication Data
US 2024/0034569 A1    Feb. 1, 2024

(30) Foreign Application Priority Data
Jul. 4, 2019 (FR) .................................. 1907453

(51) Int. Cl.
*B65G 47/14* (2006.01)
*B65G 47/256* (2006.01)
*B67B 3/064* (2006.01)

(52) U.S. Cl.
CPC ....... *B65G 47/1471* (2013.01); *B65G 47/256* (2013.01); *B67B 3/0645* (2013.01); *B65G 2201/0214* (2013.01); *B67B 2201/017* (2013.01)

(58) Field of Classification Search
CPC ........... B65G 47/1471; B65G 47/1478; B65G 47/256; B65G 2201/0214; B67B 3/0645; B67B 2201/017
See application file for complete search history.

(56) References Cited

U.S. PATENT DOCUMENTS

| 726,257 A | 4/1903 | Charles |
| 2,159,851 A | 5/1939 | Hicks |

(Continued)

FOREIGN PATENT DOCUMENTS

CN   107244540 A   10/2017

OTHER PUBLICATIONS

International Search Report dated Sep. 2, 2020 for PCT/EP2020/068699.

*Primary Examiner* — Gene O Crawford
*Assistant Examiner* — Keith R Campbell
(74) *Attorney, Agent, or Firm* — Blake T. Hudson

(57) ABSTRACT

A device for providing sorted closure elements in the form of crown caps, having a space for bulk storage of the caps, a lifting conveyor in the form of a belt entering the space and including, on an outer face, a plurality of cleats oriented transversely and spaced in order to define a recess between a lower cleat and an upper cleat, wherein each recess collects a plurality of the caps as the recess passes through the storage space and is capable of sorting unbalanced caps present inside the recess. The lower edge of the upper cleat has a convex section opposite the belt. The sorting of the unbalanced caps is configured to cooperate with the movement of the lifting conveyor to cause the incorrectly oriented caps to fall.

17 Claims, 2 Drawing Sheets

(56) References Cited

U.S. PATENT DOCUMENTS

Figure 1:
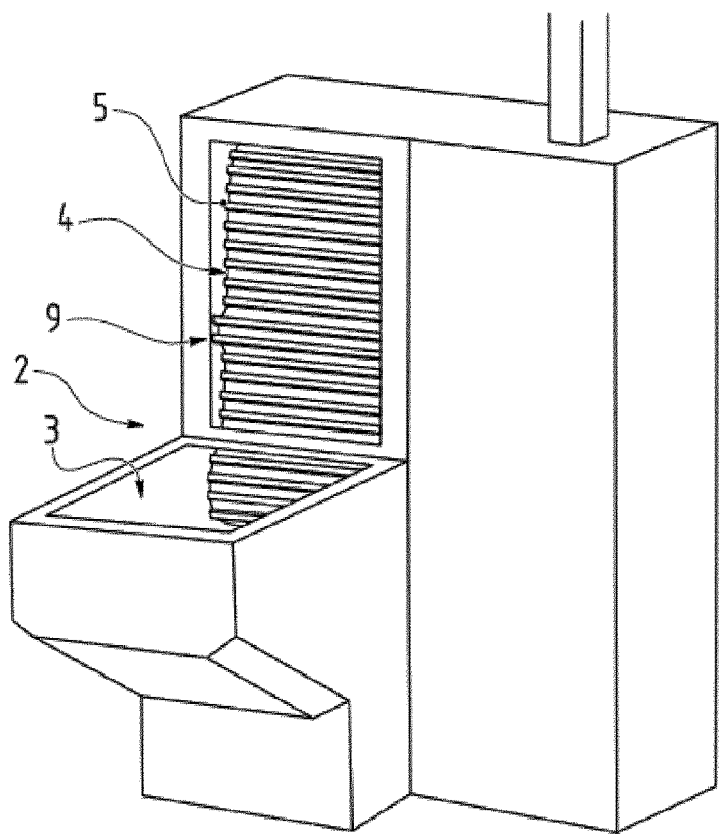

| | | | | |
|---|---|---|---|---|
| 5,038,914 | A * | 8/1991 | Cotic | E01B 29/32 |
| | | | | 198/397.06 |
| 6,491,152 | B1 * | 12/2002 | Evers, Jr. | B65G 47/1471 |
| | | | | 198/393 |
| 7,597,189 | B2 * | 10/2009 | Hinsley | B65G 15/42 |
| | | | | 198/688.1 |
| 7,850,403 | B2 * | 12/2010 | Lorange | B67B 3/0645 |
| | | | | 198/397.03 |
| 8,172,070 | B2 * | 5/2012 | Gassner | B67B 3/0645 |
| | | | | 198/397.06 |
| 9,738,451 | B2 * | 8/2017 | Mizuki | B65G 47/1471 |
| 2008/0190736 | A1 | 8/2008 | Hinsley et al. | |
| 2023/0150772 | A1 * | 5/2023 | Heimberg | B65G 47/1471 |
| | | | | 198/459.1 |

* cited by examiner

DEVICE FOR PROVIDING SORTED CLOSURE ELEMENTS

CROSS-REFERENCE TO RELATED APPLICATIONS

This application is a 371 U.S. National Stage Application of PCT Application Serial No. PCT/EP2020/068699 filed on Jul. 2, 2020, which application claims the benefit of and priority to French Application No. FR1907453, filed Jul. 4, 2019, the entire contents of each of which are hereby incorporated herein by reference.

The present invention lies in the field of providing sorted capping elements, with a view to supplying a downstream workstation within a production line.

Preferentially, such capping elements consist of caps intended to close containers, in particular flasks or bottles, made of glass or of metal, in particular of aluminium. However, the invention will find an application for capping elements that generally have a cylindrical, conical or frustoconical shape. Said capping elements can be made of any type of material, in particular plastic or metal.

Further, a container comprises an opening, in the form of a mouth, which is generally situated in the upper part of a neck. After filling, the opening of a container is hermetically closed off via a capping element, like a cap. Such a cap generally has a flattened tubular shape, resembling a hollowed disk. Said cap is closed by a concave bottom in order to internally receive a seal that ensures the sealing once the cap is positioned in contact with the mouth. Such a cap has a crenellated peripheral edge, resulting from its manufacture by stamping a metal sheet, which is in particular made of thick tinplate. This crenellated edge comprises a flare from the bottom toward the outside, giving such a cap the name of "crown" (or "crown cap").

In a known manner, the provision of capping elements, in the form of caps, is effected via a sorting module, commonly called a "cap-feeder". Such a sorting module receives at the inlet said caps that are poured in loose form into a reservoir, like a hopper. This module sorts these caps so as to dispose them in a suitable position in order then to supply sorted caps continuously to a workstation situated downstream on the production line. The main roles of such a downstream workstation are to fill the containers and then to close them by means of the sorted caps. For example, said downstream workstation can consist of a bottling module provided with a unit for capping the containers, or else a unit for sterilizing said capping elements.

In other words, a sorting module makes it possible to take caps that are initially in a jumble and to correctly orient all these caps in a regular and continuous flow supplying at least the downstream workstation of which the function is to close off each container by means of a cap. Such a sorting module is generally called a "cap-feeder".

An existing sorting module comprises in its lower part a reservoir receiving the capping elements in loose form and, passing through said reservoir, a lifting means generally formed of an endless belt oriented vertically and driven so as to extract and lift said caps. More specifically, said belt has on an outer face a succession of cleats juxtaposed along its length. Said cleats are in the form of flat bars, which are of rectangular parallelepipedal shape. Such cleats are spaced apart so as to provide housings that extend transversely, from one edge to the other of said belt, the spacing between two cleats corresponding approximately to the diameters of said caps to be picked up within the reservoir. In addition, the inclination of the belt, the configuration and the dimensions of said cleats ensure a determined positioning of the caps that are picked up.

Specifically, a cap that is positioned within a housing in a configuration other than the desired configuration, for example upside down or staggered, is off balance, tilts from its housing and drops naturally under the effect of gravity, during the vertical movement of said conveyor. Thus, once they have arrived at the end of travel, only the caps that are arranged in the chosen configuration remain within the housings. This sorting technique is commonly known as the "waterfall" technique.

A major problem lies in the fact that said regular flow sent to the outlet of the lifting means imperatively has to have correctly positioned caps, most particularly with their open face oriented toward the outside of the housings and their crenellated edge toward the outside of said housing.

Currently, once they have reached the top of the lifting means, the caps have undergone sorting that does not make it possible to ensure with certainty that no cap has an incorrect orientation.

In order to improve the sorting of the caps during their lifting, modifying the shape of the housings that are intended to receive said caps has been imagined.

An existing solution consists of cleats of which the upper edge face is shaped specifically so as to receive the crenellated peripheral edge of the caps. In particular, the upper edge face has a concave section, which forms a recessed groove over the entire length of each of said cleats. More specifically, this groove is asymmetric with respect to the thickness of each cleat, with a most reentrant point situated toward the outer face of said cleat, namely the face situated on the opposite side from the belt on which said cleat rests. Therefore, the groove has a more steeply inclined slope from the front as far as the most reentrant point, compared with the inclination of the slope extending from the rear. In addition, the inclinations of these slopes correspond to the degree of the flare of the crenellated peripheral edge.

Thus, a cap being picked up from the trough in a housing provided between two cleats, is inserted via its lower part into said groove, via the bottom of its crenellated peripheral edge. A correctly oriented cap, with its flare turned toward the outside, sees its peripheral edge coincide with the slopes of the groove of the lower cleat of the housing. In addition, insertion into the groove allows the cap to enter fully into the housing, namely the top of the peripheral edge is inserted beneath the lower edge face of the top cleat.

Otherwise, the cap is partially or even completely introduced into the groove and, therefore, into the housing between the lower edge of the upper cleat and said groove of the lower cleat. Its center of gravity is offset, and this more strongly induces its unbalancing and its drop toward the hopper.

In addition, the unbalancing can be accentuated by a sorting means that cooperates with the belt of the lifting conveyor, so as to cause the poorly oriented caps that are present in said housing to drop. Such a sorting means can comprise means that are suitable for amplifying the unbalancing of the caps, such as for example by generating vibrations of the belt, by propelling blown air or else by modifying the inclination of said belt over a distance, forming a boss or "speed bump" at the ascending strand of said belt.

However, such a solution is still not entirely satisfactory. Specifically, poorly oriented caps are still sent toward the regular continuous flow. It is then necessary to effect detection at the downstream unit, in order to eject the poorly oriented caps.

Furthermore, at the time when the caps that are present within a housing are sent, ejection means are known. Such means can be of various types, in particular pneumatic, sending pulsed or pressurized air, or even simply using a gravity effect. Another solution can consist of mechanical means, such as a member that is moved so as to push transversely along said housing, from one end toward the opposite end, pushing the caps in a line as far as an outlet provided for this purpose. Therefore, a poorly oriented cap can nest with adjacent correctly oriented caps and be ejected with the others, while it should not be. In addition, a poorly oriented cap can be immobilized against the walls of the housing. The line of caps that is suddenly immobilized is then likely to damage the member and the cleats, but also to bend the caps that are compressed at this time, or even to propel them violently.

The aim of the invention is to overcome the drawbacks of the prior art by proposing improving the sorting of caps of crown type, through a specific and determined shape of the lower edge face of the upper cleat of the housings.

In particular, the invention provides a domed lower edge face, which has a convex section, so as to determine a housing of which the depthwise shape perfectly matches the profile of the caps when they are oriented correctly.

To do this, the device for providing sorted capping elements, which are in particular in the form of caps of "crown" type, comprises:
- a volume for storage in loose form of said caps;
- a lifting conveyor in the form of a belt provided with an ascending strand that enters said storage volume;
- said lifting conveyor comprising, on its outer face, a plurality of cleats that are oriented transversely with respect to said belt and spaced apart so as to determine a housing between the upper edge face of a lower cleat and the lower edge face of an upper cleat, each housing picking up a plurality of said caps as it passes through said storage volume;
- a means for sorting by unbalancing caps that are present within said housing, said sorting means cooperating with the movement of said lifting conveyor, so as to cause the poorly oriented caps that are present in said housing to drop.

Such a provision device is characterized by the fact that the lower edge face of the upper cleat has a convex section in opposition to said belt.

According to additional features, which are not limiting, said convex section may have an angle with respect to the face of said belt, said angle being determined with respect to the inclination of the edge of said caps.

Said convex section may be rounded. Said convex section may be rounded in an arc of a circle corresponding to the flare of the peripheral edge of said caps.

A housing may comprise a rear distance situated against the belt between the upper edge face of the lower cleat and the lowest point of the lower edge face of convex section of the upper cleat, said rear distance being smaller than the outside diameter of the crenellated edge of a cap.

The upper edge face of a lower cleat may comprise a concave section that forms a groove.

Said groove may have an asymmetric section and comprises a rear slope situated against the belt that is inclined less than the slope that is situated in opposition toward the outside of the housing.

The invention also relates to a cleat on its own, which is in particular intended to equip a device for providing sorted capping elements.

Such a cleat for a device for providing sorted capping elements comprises a flattened bar, characterized by the fact that the lower edge face of said bar of said cleat has a convex section.

According to additional features, which are not limiting, said convex section may be is rounded.

The upper edge face of the bar of said cleat may comprise a concave section that forms a groove.

Figure 2:
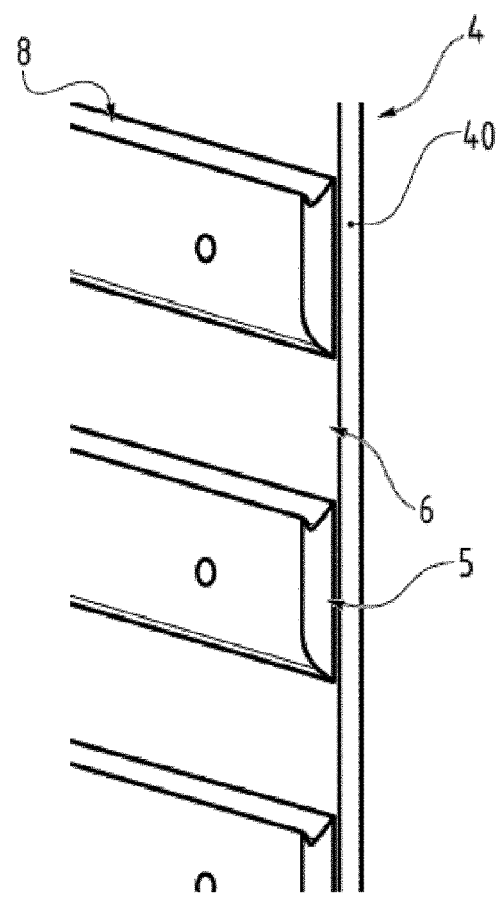
Figure 3:
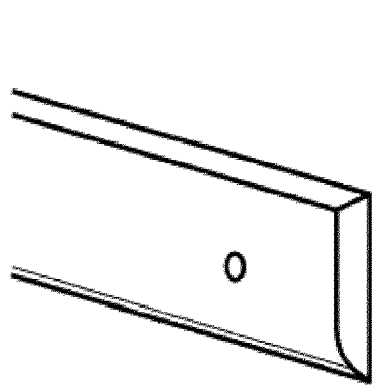
Figure 4:
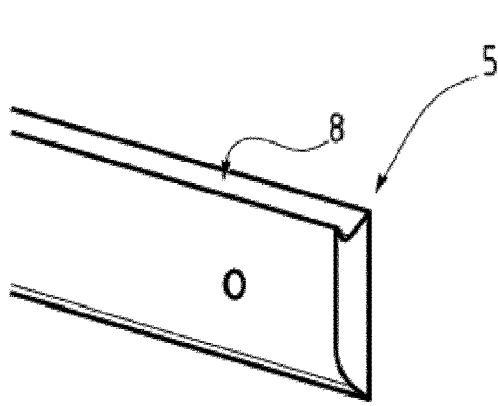
Figure 5:
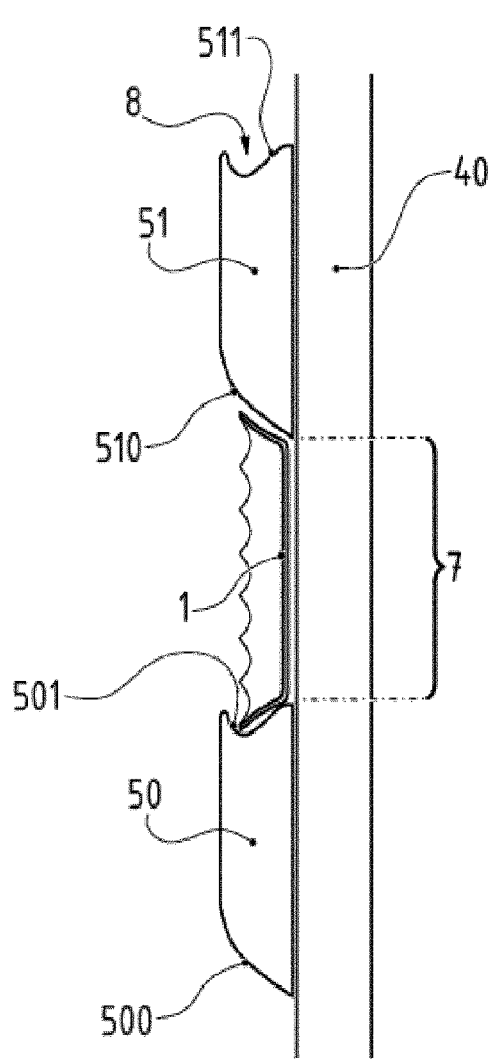
Figure 6:
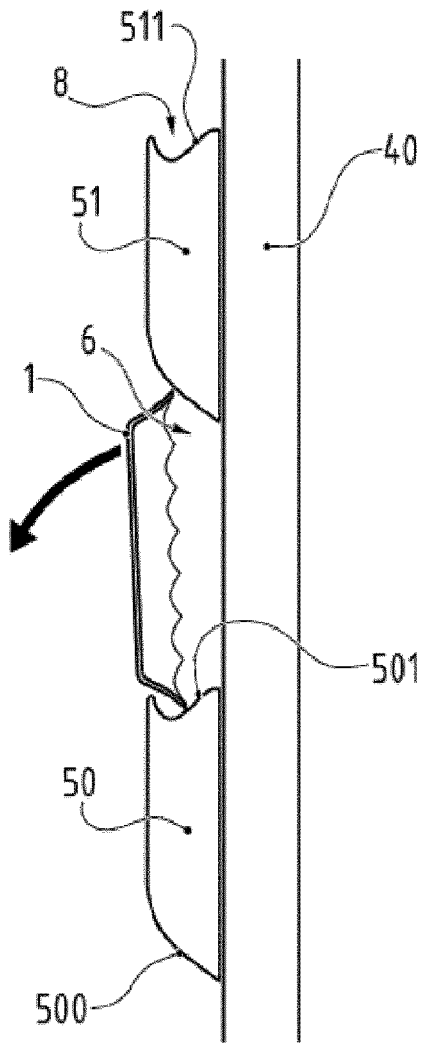

Other features and advantages of the invention will become apparent from the following detailed description of the non-limiting embodiments of the invention, with reference to the appended figures, in which:

FIG. 1 schematically shows a perspective view of an embodiment of a device for providing sorted capping elements;

FIG. 2 schematically shows a perspective view of a detail of a provision device, partially showing a lifting conveyor;

FIG. 3 schematically shows a perspective view of a part of a cleat according to a first embodiment;

FIG. 4 schematically shows a view similar to FIG. 3, showing a cleat according to another embodiment;

FIG. 5 schematically shows a sectional view of a housing according to one embodiment, showing the positioning of a correctly oriented cap by insertion; and FIG. 6 schematically shows a sectional view of a housing according to one embodiment, showing a poorly oriented and off-balance cap.

The present invention relates to the provision of capping elements within an industrial line for production and processing of products forming containers. Said capping elements are each intended to close off the opening of one of the products, after it has been filled.

Specifically, a container comprises an opening, in the form of a mouth, which is generally situated in the upper part of a neck. After filling, the opening of a container is hermetically closed off via a capping element, which is preferentially in the form of a cap 1.

Such a cap 1 generally has a flattened tubular shape, closed by a concave bottom in order to internally receive a seal that ensures the sealing once the cap 1 is positioned in contact with the mouth. Such a cap 1 has a crenellated peripheral edge, resulting from its manufacture by stamping a metal sheet, which is in particular made of thick tinplate. This crenellated edge comprises a flare from the bottom toward the outside, giving such a cap 1 the name of "crown" (or "crown cap").

An example of such a cap 1 is visible in section in FIGS. 5 and 6.

In this context, the provision of capping elements, in the form of caps 1, is effected via a sorting module, which receives said caps 1 at the inlet. This module sorts these caps 1 so as to dispose them in a suitable position in order then to supply sorted caps 1 continuously to a workstation situated downstream on the production line, like a capping station.

Therefore, the invention relates to the invention relates to a device 2 for providing sorted capping elements.

The provision device 2 is supplied with capping elements, namely with caps 1. Such a supply can be effected from a station situated upstream, such as a module for manufacturing capping elements, for example a station for stamping caps 1. Such a supply can then be carried out automatically.

The supply can also be effected by pouring the caps 1, which have previously been manufactured and packaged, for example in cartons. These cartons are emptied in the device 2 by an operator, such that the caps 1 can be picked up and sorted.

To do this, the provision device 2 comprises a volume 3 for storage in loose form of said caps 1. Preferentially, this storage volume 3 can have the form of a hopper or a trough, which is as one with the provision device 2, in particular forming an integral part or securely attached to the structure thereof.

The caps 1 supply the storage volume 3 and remain there temporarily, before being picked up and sorted.

To this end, the provision device 2 comprises a lifting conveyor 4 in the form of a belt 40 provided with an ascending strand that enters said storage volume 3. The conveyor 4 is preferentially of the endless belt type, said belt 40 being wound around return rollers, which are free and motorized.

In addition, said belt 40 of the conveyor 4 extends vertically or substantially vertically. The motor therefore drives the ascending strand from the bottom toward the top, transporting the caps 1 from said storage volume 3.

To do this, said lifting conveyor 4 comprises, on its outer face, a plurality of cleats 5. These cleats 5 are fastened to said belt 40.

Said cleats 5 are oriented transversely with respect to said belt 40. In other words, said cleats 5 are positioned across the width of the conveyor 4, extending from one edge to the other of the belt 40. The cleats 5 therefore extend horizontally or substantially horizontally. The cleats 5 are parallel to each other. Consequently, the cleats 5 are orthogonal with respect to the direction of movement of the conveyor 4.

In addition, the cleats 5 are spaced apart so as to determine a housing 6. The housing 6 is therefore formed between the upper edge face 501 of a lower cleat 50 and the lower edge face 510 of an upper cleat 51. In sum, two adjacent cleats 50, 51 constitute a housing 6 between their edges that face each other.

The cleats 5, 50, 51 are spaced apart in particular at regular intervals.

In addition, each cleat 5, 50, 51 can be in the form of a flattened bar, which is of generally rectangular parallelepipedal shape.

Each housing 6 picks up a plurality of said caps 1 as it passes through said storage volume 3. Therefore, the interval between the cleats 5, 50, 51 is determined so that the dimensions of a housing 6 correspond to the dimensions of the capping elements, in particular their external diameter, such that said capping elements pass at least partially into a housing 6 as it passes through said storage volume 3.

It will be noted that during this picking up, the capping elements can be introduced into a housing 6 in any orientation, namely with their top turned toward the belt 40 or else turned in opposition to said belt 40 toward the outside. An example of a cap 1 with its top turned toward the belt 40 is visible in FIG. 5, while a cap 1 oriented in the opposite direction is visible in FIG. 6.

Like at the outlet of the provision device 2, the capping elements have to all be oriented in the same way, preferentially with their top turned toward the belt 40, the capping elements that are turned in the other direction should be sorted.

To do this, the provision device 2 makes provision for a first sorting during the ascent of the capping elements, by generating unbalancing of the capping elements, such that, if they are poorly oriented, or even poorly positioned or introduced into the housings 6, these elements drop under the effect of gravity. Preferably, the off-balance capping elements drop toward the storage volume 3 where they can be picked up again. Therefore, such a provision device 2 is commonly called a "waterfall" type device.

Consequently, the provision device 2 comprises a means 9 for sorting by unbalancing caps 1 that are present within said housing 6. This sorting means 9 cooperates with the movement of said lifting conveyor 4, so as to cause the poorly oriented caps 1 that are present in said housing 6 to drop.

Such a sorting means 9 can comprise means that are suitable for amplifying the unbalancing of the caps 1, such as for example by generating vibrations of the belt 40, by propelling blown air or else by modifying the inclination of said belt 40 over a distance, forming a boss or "speed bump" at the ascending strand of said belt 40.

In order to improve the sorting of the capping elements during their lifting by the conveyor 4, the provision device 2 provides specifically shaped cleats 5, 50, 51.

Advantageously, at least the lower edge face 510 of the upper cleat 51 has a convex section in opposition to said belt 40. In other words, said lower edge face 510, preferentially of each cleat 5, 50, 51, comprises a section that is inclined with an increasing slope from the belt 40 toward said cleat 5, 50, 51. In sum, the lower edge face 510 forms a bevel or chamfer.

Preferentially, the upper cleat 51 can have a rear height situated against the belt 40 that is greater than its height that is situated in opposition toward the outside of the housing 6. In sum, its rear face is higher than its front face.

Such a bevel can be straight or rectilinear. Preferentially, said convex section is rounded, namely having an arc of a circle. Therefore, the section is domed toward the outside.

Preferentially, the lower edge face 500, 510 can have a rounded convex section, which namely in particular has a rounded portion and a straight portion. Said rounded section can be situated toward the outside, namely in a distal manner with respect to said belt 40. An example of such a convex section with a rounded portion and a rectilinear portion is visible in FIGS. 2 to 6.

In addition, such a rounded configuration makes it easier to introduce the capping elements, in particular caps 1, into a housing 6 during picking up thereof. In sum, the rounding allows better nesting of the correctly oriented caps 1 and limits the possibility of poorly oriented caps being introduced into and remaining in the housing 6. These aspects are in particular visible in FIGS. 5 and 6.

Furthermore, said convex section can be rounded in an arc of a circle corresponding to the flare of the peripheral edge of said caps 1. In sum, at least the lower edge face 500, 510 is machined during the manufacture of the cleats 5, 50, 51, according to dimensions and/or shapes that correspond to those of the capping elements to be picked up.

Likewise, said convex section can have an angle with respect to the face of said belt 40, said angle being determined with respect to the inclination of the edge of said caps 1. This angle extends in a general manner preferentially along the rectilinear section of said convex portion. Such an angle can be between 5° and 85° with respect to a plane that is orthogonal to the surface of the belt 40, namely with respect to the normal of said belt 40. Preferentially, in the case of a cap 1, the angle is 35° with respect to said normal to the belt 40. FIG. 5 shows most particularly the angle of inclination of the convex part, improving the introduction of a cap 1.

Furthermore, a housing 6 can comprise a rear distance 7 situated against the belt 40 between the upper edge face 501 of the lower cleat 50 and the lowest point of the lower edge face 510 of the convex section of the upper cleat 51, such that said rear distance 7 is smaller than the outside diameter of the crenellated edge of a cap 1. Such a distance is visible in particular in FIG. 5. Therefore, a cap 1 can be introduced perfectly into the housing 6 until it comes against the surface of the belt 40.

As such, the diameter of a standard cap 1 can be between 10 and 50 mm (millimeters), preferentially 26 mm, 29 mm or 32 mm for a cap 1 of crown type.

In sum, in the general case of a capping element, the shape of the top and bottom walls of the housing 6 can be provided complementary to the shape of a capping element, preferentially to the specific shape of a cap 1.

It will be noted that the upper edge 501, 511 of a cleat 5, 50, 51 can be straight, as visible in particular in the embodiment in FIG. 3.

In order to improve the retention in a housing 6 of a correctly oriented cap 1, the upper edge face 501 of a lower cleat 50 can comprise a concave section that forms a groove 8.

Such a groove 8 can be formed by a bevel or a chamfer, forming a slope toward the surface of the belt 40. Thus, said groove 8 is formed by this slope and the belt 40.

Preferentially, said groove 8 has an asymmetric section and comprises a rear slope situated against the belt 40 that is inclined less than the slope that is situated in opposition toward the outside of the housing 6. This asymmetric configuration of the groove 8 is particularly visible in FIGS. 4 to 6.

Thus, at the outlet of the provision device 2, the invention ensures that all the capping elements are correctly oriented.

As such, in a subsidiary manner, once the capping elements have been picked up and transported in an ascending manner by the conveyor 4, which effects sorting during their lifting, the sorted elements that remain in each housing 6 are sent downstream, in particular in order to reference the flow of elements according to a determined rate. This sending is effected in particular via suitable ejection means, which ensure the linear extraction of the elements that are present in each housing 6, in successive lines. Such ejection means can comprise a mechanical pushing member, a blower using air, in particular compressed air, or else configured to eject the elements under the effect of gravity.

In a related manner, the invention also relates to a cleat on its own, as described above. Hence, the provision device 2 comprises at least one of these cleats 5.

Preferentially, one of these cleats 5 comprises a flattened bar with its lower edge face 500, 510 having a convex section.

In addition, said convex section can be rounded.

In addition, the upper edge face 501, 511 of the bar can comprise a concave section that forms a groove 8.

The invention claimed is:

1. A device (2) for providing sorted crown capping elements comprising:
   a volume (3) for storage in loose form of said caps (1);
   a lifting conveyor (4) in the form of a belt (40) provided with an ascending strand that enters said storage volume (3);
   said lifting conveyor (4) comprising, on its outer face, a plurality of cleats (5) that are oriented transversely with respect to said belt (40) and spaced apart so as to determine a housing (6) between the upper edge face (501) of a lower cleat (500) and the lower edge face (510) of an upper cleat (51), each housing (6) picking up a plurality of said caps (1) as it passes through said storage volume (3);
   a means (9) for sorting by unbalancing caps (1) that are present within said housing (1), said sorting means (9) cooperating with the movement of said lifting conveyor (4), so as to cause the poorly oriented caps (1) that are present in said housing (6) to drop, wherein
   the lower edge face (510) of the upper cleat (51) has a convex section in opposition to said belt (40), and wherein the upper edge face (501) of the lower cleat (50) comprises a concave section that forms a groove (8).

2. The provision device (2) as claimed in claim 1, wherein said convex section of the lower edge face of the upper cleat has an angle with respect to the face of said belt (40), said angle being determined with respect to an inclination of an edge of said caps (1).

3. The provision device (2) as claimed in claim 1, wherein said convex section is rounded.

4. The provision device (2) as claimed in claim 2, wherein said convex section is rounded in an arc of a circle corresponding to the flare of the peripheral edge of said caps (1).

5. The provision device (2) as claimed in claim 1, wherein athe housing (6) comprises a rear distance (7) situated against the belt (40) between the upper edge face (501) of the lower cleat (50) and the lowest point of the lower edge face (510) of convex section of the upper cleat (51), said rear distance (7) being smaller than the outside diameter of the crenellated edge of a cap (1).

6. The provision device (2) as claimed in claim 1, wherein said groove (8) has an asymmetric section and comprises a rear slope situated against the belt (40) that is inclined less than the slope that is situated in opposition toward the outside of the housing (6).

7. A cleat (5) for a device (2) for providing sorted capping elements according to claim 1, comprising a flattened bar, wherein the lower edge face of said bar of said cleat (5) has a convex section.

8. The cleat (5) as claimed in claim 7, wherein said convex section is rounded.

9. The cleat (5) as claimed in claim 7, wherein the upper edge face of the bar of said cleat (5) comprises a concave section that forms a groove (8).

10. The provision device (2) as claimed in claim 2, wherein the housing (6) comprises a rear distance (7) situated against the belt (40) between the upper edge face (501) of the lower cleat (50) and the lowest point of the lower edge face (510) of convex section of the upper cleat (51), said rear distance (7) being smaller than the outside diameter of the crenellated edge of a cap (1).

11. The provision device (2) as claimed in claim 3, wherein the housing (6) comprises a rear distance (7) situated against the belt (40) between the upper edge face (501) of the lower cleat (50) and the lowest point of the lower edge face (510) of convex section of the upper cleat (51), said rear distance (7) being smaller than the outside diameter of the crenellated edge of a cap (1).

12. The provision device (2) as claimed in claim 4, wherein the housing (6) comprises a rear distance (7) situated against the belt (40) between the upper edge face (501) of the lower cleat (50) and the lowest point of the lower edge face (510) of convex section of the upper cleat (51), said rear distance (7) being smaller than the outside diameter of the crenellated edge of a cap (1).

13. The provision device (2) as claimed in claim 2, wherein that the upper edge face (501) of the lower cleat (50) comprises a concave section that forms a groove (8).

14. The provision device (2) as claimed in claim 3, wherein that the upper edge face (501) of the lower cleat (50) comprises a concave section that forms a groove (8).

15. The provision device (2) as claimed in claim 4, wherein that the upper edge face (501) of the lower cleat (50) comprises a concave section that forms a groove (8).

16. The provision device (2) as claimed in claim 5, wherein that the upper edge face (501) of the lower cleat (50) comprises a concave section that forms a groove (8).

17. The cleat (5) as claimed in claim 8, wherein the upper edge face of the bar of said cleat (5) comprises a concave section that forms a groove (8).

* * * * *